Dec. 15, 1953
M. W. ROSCOE
2,662,360
COTTON STRIPPER
Original Filed April 5, 1945
3 Sheets-Sheet 1
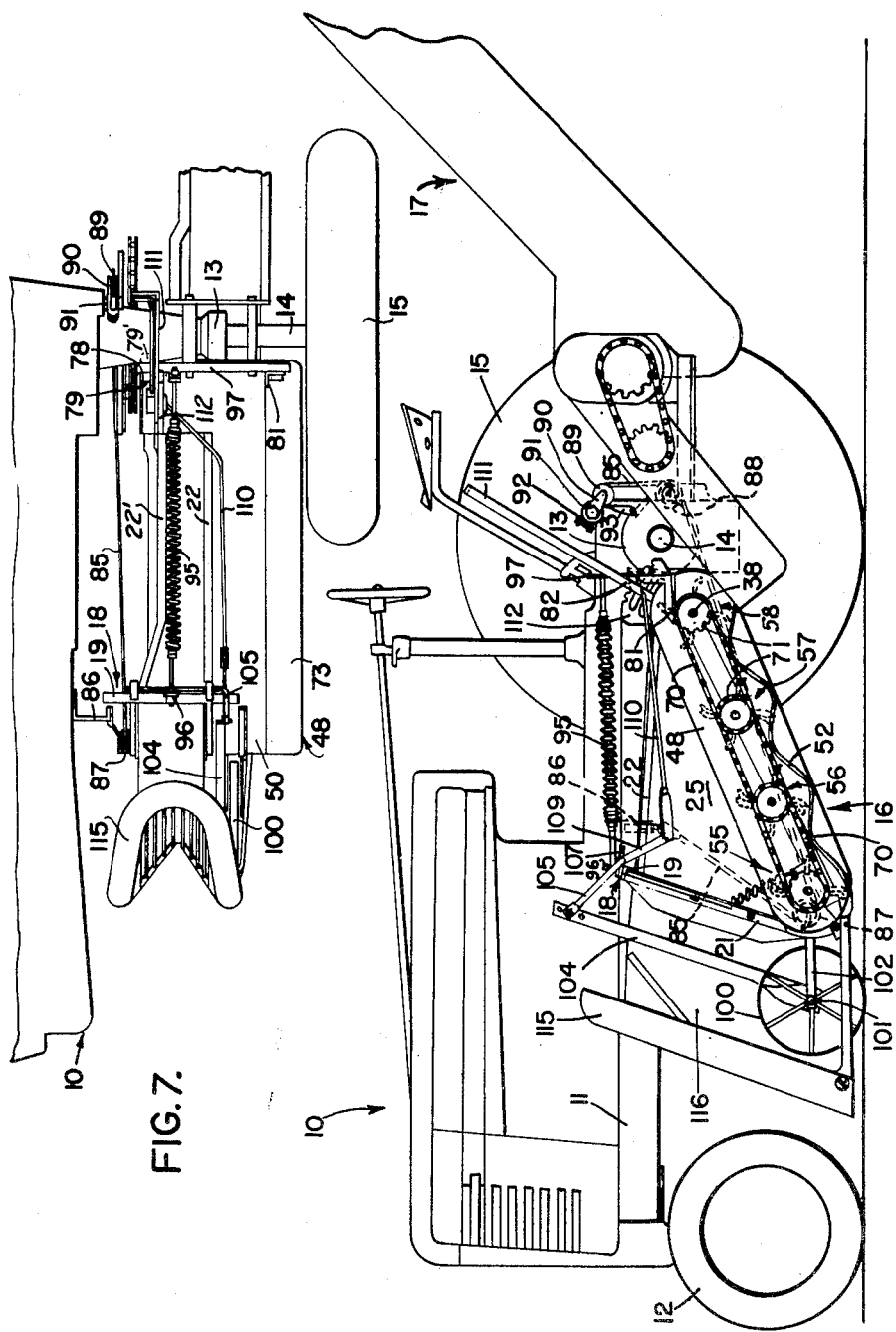
INVENTOR.
M. W. ROSCOE
BY
ATT'YS

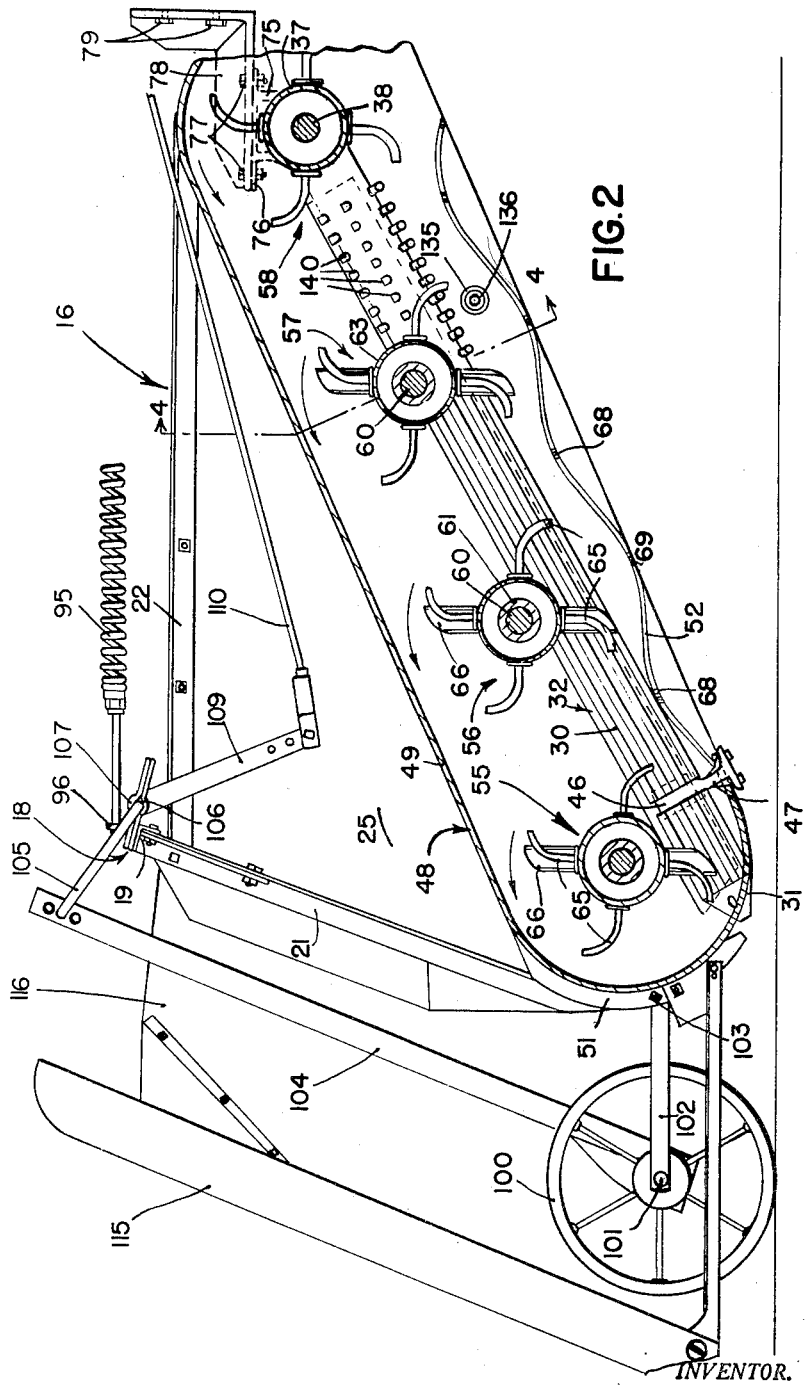

Dec. 15, 1953   M. W. ROSCOE   2,662,360
COTTON STRIPPER
Original Filed April 5, 1945   3 Sheets-Sheet 3
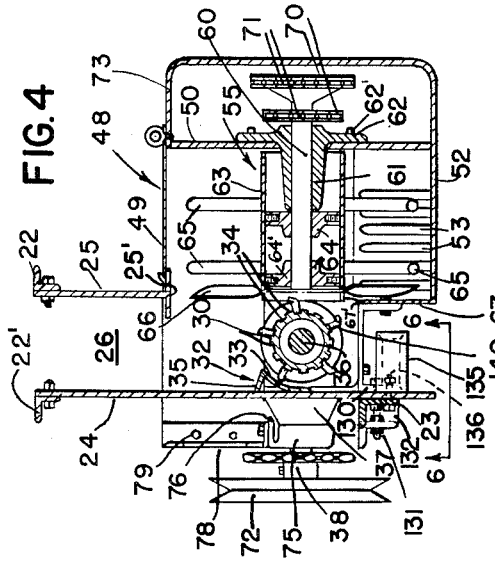
INVENTOR.
M. W. ROSCOE
ATT'YS Patented Dec. 15, 1953

2,662,360

UNITED STATES PATENT OFFICE 2,662,360

COTTON STRIPPER

Merrill W. Roscoe, Moline, Ill., assignor to Deere & Company, Moline, Ill., a corporation of Illinois Original application April 5, 1945, Serial No. 586,780. Divided and this application July 7, 1950, Serial No. 172,529

4 Claims. (Cl. 56—30)

The present invention relates generally to cotton harvesters and more particularly to harvesters of the stripper type, and has for its principal object the provision of a novel and improved cotton stripper that operates more efficiently and gathers less trash along with the cotton, but which is simple in construction and inexpensive to manufacture.

This invention is in the nature of an improvement over the cotton stripper disclosed in Patent 2,045,633, granted June 30, 1936, to Court and is a division of my co-pending application Serial No. 586,780, filed April 5, 1945, now Patent No. 2,533,510. Strippers of this type are provided with a stripping roll and a concave stripper plate disposed alongside the roll, the cotton plants being received between the roll and the plate as the machine advances through the field and the stripped cotton being moved laterally into a cleaning trough which contains a number of rotary beaters for agitating the bolls and causing the stems and leaves to drop through the perforated bottom of the trough.

Under some conditions of operation, in which the bolls of cotton are very easily separated from the plants, it is desirable to provide less aggressive stripping means so that less trash in the form of stems, leaves, and dirt, is separated from the plants and results in a much cleaner harvested crop. However, I have found that merely removing the pegs or teeth from the stripper roll introduces other problems, for there is then no means for urging the stripped cotton bolls laterally into the cleaning trough, with the result that the bolls tend to ride on top of the roll and stripper plate.

One of the objects of my invention, therefore, has to do with the provision of apparatus for urging the stripped cotton bolls laterally into the cleaning trough.

Another object of the invention concerns the provision of means for causing air currents to move transversely across the stripping means for the purpose of facilitating the transfer of cotton from the stripping means to the receiving trough. A further object resides in the utilization of combination agitating and air-current-inducing means for this purpose, the agitating means being in the form of a plurality of radial arms adapted to positively engage and move the cotton once it has been received in the trough and the other means comprising blades in the form of radial arms having such pitch and characteristics as to facilitate the lateral transfer of the cotton as stated above.

These and other objects and advantages of my invention will be apparent to those skilled in the art after a consideration of the following description, in which reference is had to the drawings appended hereto, in which Figure 1 is a side elevational view of a tractor mounted cotton harvester embodying the principles of my invention, the outer cover of the implement and the near wheel of the tractor being removed to show the details of the driving mechanism.

Figure 2 is a vertical sectional view of the harvesting unit, drawn to an enlarged scale, and taken in section along the line 2—2 in Figure 3.

Figure 3 is a plan view of the harvesting unit, drawn to the same scale as Figure 2, portions of the walls being broken away to show the mechanism within the housing and parts of the mechanism being shown in section.

Figure 4 is a transverse sectional view taken along the line 4—4 in Figure 2.

Figure 5 is a fragmentary sectional view taken along the line 5—5 in Figure 3, showing a device for lateral adjustment of the side wall of the housing.

Figure 6 is a fragmentary bottom view as viewed along a line 6—6 in Figure 4, showing another provision for lateral adjustment of the side wall of the housing.

Figure 7 is a fragmentary top plan view showing a harvester unit mounted on one side of a tractor.

The tractor, indicated in its entirety by reference numeral 10, comprises a narrow longitudinally extending frame 11 mounted on a centrally disposed dirigible wheel truck 12 at its forward end and having conventional rear axle housings 13 within which are journaled drive axles 14 carried on laterally spaced traction wheels 15.

The cotton harvester comprises a gathering and cleaning unit 16 and an elevating unit 17 for conveying the harvested cotton to a wagon or trailer (not shown). The gathering unit 16 is mounted on the rear axle housing 13 of the tractor between the body or frame 11 and one traction wheel 15, by means providing for vertical swinging movement about a transverse axis.

The gathering unit 16 includes an angle iron frame comprising a yoke 18 consisting of an upper transverse angle member 19 and a pair of downwardly and forwardly inclined, laterally spaced inner and outer angle members 20, 21. A pair of laterally spaced angle members 22, 22' are secured to the upper portions of the inclined frame members 21, 20, respectively, and extend generally horizontally rearwardly therefrom, forming the upper longitudinally extending corners of the frame 16. Inner and outer laterally spaced vertical side sheets 24, 25 are mounted at their forward ends on the frame members 20, 21, respectively, and extend rearwardly therefrom, their upper edges being fixed to the horizontally disposed frame members 22', 22. An angle iron frame member 23 is secured by bolts 28' to the inner side wall 24. The sheets 24, 25 form a plant-receiving passage 26 therebetween, within which the row of cotton plants is received for harvesting as the implement advances in the field.

The cotton bolls are stripped from the plants by means of a rotatable stripper element or roll 30, which is generally cylindrical in shape and which extends longitudinally below the passageway between the two side walls 24, 25. This roll is inclined forwardly and downwardly and has a conical forward end 31 which guides the plant between the roll and a second stripper element in the form of a stripper plate 32 mounted on the inner wall 24 and extending alongside of and parallel to the stripper roll. The plate has a concave stripping surface 33, spaced from the adjacent surface of the cylindrical roll 30 and formed on an arc of curvature about the axis of the roll. This space forms a continuous slot between the roll and the curved surface 33 through which the plants in the row are drawn downwardly as the machine advances, while the roll rotates in a clockwise direction as viewed in Figure 4. The surface of the roll 30 is provided with circumferentially spaced flutes or grooves 34 for dislodging the cotton bolls upwardly from the plant as the latter are pulled through the slot by the forward movement of the machine. The surface 33 curves upwardly over the adjacent surface of the roll 30 to an edge above the latter, and the plate 32 has a top surface 35 which inclines upwardly and laterally from the upper edge of the curved surface 33 to the inside of the wall 24.

The roll 30 is mounted rigidly and coaxially upon a supporting shaft 36 journaled at its upper and rearward end in a gear casing 37. A drive shaft 38 extends transversely through the gear casing 37 and is rotatably supported in a pair of laterally spaced ball bearings 39, 40. The roll shaft 36 is driven from the drive shaft 38 through a pair of intermeshing bevel gears 44, 45. The forward end of the roll supporting shaft 36 is supported in a bearing member 46 on a bracket 47 rigidly carried on the bottom of a housing portion 48 which extends laterally from the outer side wall 25.

The cleaner housing 48 comprises a top wall 49 extending laterally from the lower edge 25' of the outer passage wall 25, an outer side wall 50 substantially parallel to the wall 25, and a front end wall 51 curving downwardly from the top wall 49. A bottom wall or floor means 52 within the housing 48 is provided with a plurality of laterally spaced slots 53 through which dirt and trash from the cotton will drop to the ground. Rotatable cleaning devices in the form of pin rolls 55, 56, 57, 58 are provided within the cleaner housing 48 for the purpose of agitating the material stripped from the cotton plants, to separate the trash and dirt from the cotton bolls and to propel the latter upwardly and rearwardly over the floor 52 of the cleaner housing 48.

Each of the pin rolls comprises a transverse shaft 60 journaled in a bearing sleeve 61 having a supporting flange 62 secured by bolts 62' to the outer side of the side wall 50. Each of the pin rolls is provided with a cylindrical roll body 63 rigidly mounted on the shaft 60 on a pair of axially spaced spiders 64, 64'. The cylindrical body 63 carries a plurality of radial arms in the form of outwardly extending pins or fingers 65. Each of the pin rolls revolves in a counterclockwise direction as viewed in Figure 2, and the fingers 65 are curved in a trailing direction and are adapted to positively engage the harvested material within the housing 48. The bottom wall 52 is sinuous to provide transverse troughs 68 beneath the rotatable pin rolls, with crests 69 between the latter. Rotation of the rolls causes the fingers 65 to engage the cotton bolls lying in the troughs and to propel the bolls rearwardly over the perforated floor 52.

A two-bladed propeller 66 is mounted on the inner end of each of the pin roll shafts 60, the blades of each propeller 66 comprising radial arms having a pitch adapted to urge the cotton bolls laterally over the stripper roll into the cleaner housing, and also to induce air currents transversely across the top of the stripper roll 30 into the cleaner housing 48, which air currents aid in moving the bolls laterally.

The housing 48 is also provided with an inner wall 67 substantially in the plane of the wall 25 but having an upper edge 64' terminating beneath the stripper roll 30. This wall 67 is spaced from the wall 24 to define the lower portion of the plant-receiving passage and prevents cotton from falling from the housing 48.

The upper pin roll 58 is mounted on the drive shaft 38, and the other three pin rolls are driven by power received from the upper shaft 38 through a series of drive chains 70, each chain 70 being trained over a pair of sprockets 71 fixed to each pair of adjacent shafts 60, respectively. The shaft 38 receives its power from a sheave 72, which in turn may be driven from any suitable rotating shaft. The drive chains 70 and sprockets 71 are enclosed within a cover 73 mounted on the outer side of the housing 48.

The gathering unit 16 is mounted on the tractor for vertical swinging movement about the axis of the drive shaft 38. This is accomplished by supporting the inner end of the gear casing 37 in a journal bearing 75 provided with a substantially horizontal flange 76, which is secured by bolts 77 to an L-shaped bracket 78 having a vertical leg mounted by bolts 79 on suitable bosses 79' on the front side of the tractor axle housing 13. The outer end of the shaft 38 is rotatably supported on the tractor by means of a bearing member 80, within which the ball bearing 40 is encased, the member 80 being supported on an outer L-shaped bracket 81 which has a vertical leg 82 mounted on the forward side of the axle housing 13 in a manner similar to that described for the inner bracket 78.

The gathering unit 16 is raised and lowered about the axis of the shaft 38 by means of a cable 85 connected at one end to a bracket 86 which is rigidly mounted on the side of the tractor frame 11. The cable 85 passes forwardly and downwardly under a sheave 87 journaled on the gatherer frame and passes then rearwardly along the inner side of the gatherer unit and upwardly over a sheave 88 journaled on the rear side of the tractor axle housing 13. The cable passes over a sheave 89 journaled on a lifting arm 90 rigidly clamped to the tractor power lift rockshaft 91 by means of a clamping device 92. The cable 85 passes downwardly over the sheave 89 and is secured to the tractor body by means of a fitting 93. When the arm 90 is raised, the cable 85 is pulled upwardly over the sheaves 88, 89, thereby raising the sheave 87 and the forward end of the gathering unit 16. A counterbalancing spring 95 is connected between a lug 96 on the transverse frame member 19 and a vertical supporting plate 97 fixed to the forward side of the tractor axle housing 13.

The forward end of the gathering unit 16 is gauged from the ground by means of a gauge wheel 100 journaled on an axle 101 carried between the forward ends of a forward end of the cleaner housing 48. A supporting member 104 is fixed to the axle 101 and extends upwardly and rearwardly and is connected at its upper end to an arm 105 mounted on a transverse rockshaft 106, which is journaled in a pair of laterally spaced bearings 107 attached to the upper transverse frame member 19. A second crank arm 109 is attached to the rockshaft 106 and is connected by a link 110 to a hand lever 111 swingably mounted on the top of the gathering unit 16 and associated with a suitable notched sector 112 to which the lever is latched in adjusted position. By swinging the lever 111 rearwardly, the link 110 moves rearwardly, thereby rocking the rockshaft 106 to swing the arm 105 downwardly, thereby pushing the gauge wheel 100 downwardly and raising the forward end of the gathering unit 16. This adjustment is made for adjusting the lower conical end 31 of the stripper roll 30.

The row of cotton plants is guided into the passage 26 between the walls 24, 25 by means of a plant-receiving hood 115 mounted on the forward end of a tunnel 116, the sides and top of which form extensions of the side walls 24, 25 and top frame members 22, 22' of the gathering unit. Inwardly converging guide members 117 guide the row of plants into a slot 118 between two guide rods 119 which lead to the slot between the stripper roll 30 and the stripper plate 32. The curvature of the concave surface 33 causes the plant to incline over the stripper roll 30 so that the bolls of cotton are engaged by the top of the stripper roll and are thrown laterally into the cleaner housing 48. This movement of the cotton is aided by the propeller blades 66. Any bolls that drop on top of the stripper plate on the inclined surface 35 slide or roll from the latter to the top of the stripper roll 30 and do not become lodged on the surface 35.

The spacing between the curved surface 33 of the stripper plate 32 and the cylindrical stripper roll 30 can be adjusted by shifting the entire inner wall 24 laterally relative to the stripper roll 30, since the stripper plate 32 is rigidly fixed to the wall 24. This adjustment is accomplished by two adjustable devices disposed near the front and rear of the side wall 24, respectively.

The front of the side wall 24 is adjusted laterally by means of a diagonal brace rod 121, pivotally connected by a bolt 122 to the inclined frame member 20 and extending upwardly and laterally through a sleeve 123 and through a suitable aperture in the flange of the transverse frame member 19, the flange being bent downwardly and laterally as indicated at 124. The brace rod 121 is threaded to receive a nut 125 at the upper end thereof and a second nut 126 at the lower end of the sleeve 123. By adjusting the nuts 125, 126 along the brace rod 121, the latter is shifted to swing the side wall 24 laterally to adjust the forward end of the stripper plate relative to the stripper roll.

The rear end of the side wall 24 is laterally adjustable by adjusting the rear end of the inclined frame member 23 laterally with respect to the gear casing 37. The gear casing 37 is provided with a downwardly extending flange 130 (Figure 6) apertured to receive a pair of threaded bolts 131 which also extend through aligned apertures in the vertical flange of the horizontal angle member 23, the latter being bent outwardly as indicated at 132 to space the rear end of the frame member 23 from the flange 130. The bolts 131 are provided with nuts 133, which are tightened rigidly against the vertical flange of the member 23, clamping the latter between the nuts 123 and the heads of the bolts 131. A second pair of nuts 134 is provided on each of the bolts 131, on opposite sides of the flange 130, respectively. The bolts 131 can be shifted laterally with respect to the flange 130 by adjustment of the nuts 134, and since the bolts 131 are rigid with respect to the frame member 23, the latter is shifted thereby to shift the side wall 24 and therefore the stripper plate 32 which is rigidly fixed thereto.

A stalk depressor 135 is provided in the form of a stub shaft rotatably mounted on a bolt 136 which extends through a suitable aperture in the side wall 24 and the frame member 23. The stub shaft 135 extends laterally across the passage between the stripper plate 32 and the stripper roll 30 and is spaced ahead of the rear end of the stripper roll to engage tall plants and cause them to be pulled downwardly between the stripper roll and plate as the implement moves forwardly, before the plants are pushed to the rear of the stripper roll and become entangled therewith.

The upper end of the stripper roll 30 is provided with a plurality of axially and peripherally spaced pins or pegs 140, which extend from the rear end of the stripper roll 30 to points slightly ahead of the stalk depressor 135. It is found that in certain conditions, where there are tall weeds among the cotton plants, the weeds tend to pull out by the roots and, without the pins 140, the weeds merely hang over the upper end of the stripper roll and accumulate there until the mechanism is clogged, or until the weeds are pulled out by hand. However, the pins or pegs 140 either chew up the weeds, or pull the tall stalks up into the cleaning housing 48 where they are torn up by the pin rolls.

I do not intend my invention to be limited to the exact details shown and described herein.

I claim:

1. In a cotton harvester, the combination including: frame structure; stripping means carried by the frame structure and comprising a pair of side-by-side stripping elements defining between them an elongated slot for receiving cotton plants, said elements being operative to strip cotton upwardly from such plants; cotton-receiving trough means carried by the frame structure alongside the stripping means for receiving stripped cotton from the stripping means; and conveying apparatus on the frame structure cooperative with the trough means and comprising means for causing currents of air to move crosswise of and over the stripping means and toward the trough means for facilitating the transfer of stripped cottom from the stripping means to the trough means, and movable means for positively engaging and moving the transferred cotton along the trough means.

2. The invention defined in claim 1, further characterized in that: the means for causing the air currents includes a plurality of air propellers positioned over the trough means and rotatable on axes spaced apart lengthwise of the trough.

3. The invention defined in claim 2, further characterized in that: the means for positively engaging the transferred cotton includes rotatable cotton impellers respectively coaxial with certain of the air propellers.

4. In a cotton harvester, the combination including: frame structure; stripping means carried by the frame structure and comprising a pair of side-by-side elements defining between them an elongated slot for receiving cotton plants and operative to strip cotton upwardly from such plants so that such stripped cotton may be at least temporarily supported by and on top of said elements; cotton-receiving trough means carried by the frame structure alongside the stripping elements and having floor means below the level of the top of the stripping means; and apparatus on the frame structure for causing the transfer of stripped cotton from the stripping means to the trough means and for causing movement of the transferred cotton along the floor means of the trough means, comprising a plurality of rotatable means spaced lengthwise along the trough means and rotatable respectively on axes transverse to the length of the trough means, each rotatable means having radial arms thereon describing a circle having a portion thereof above the level of the stripper means and another portion adjacent the floor means of the trough means, certain of the radial arms being shaped to cause the movement of air currents crosswise of and above the stripping means to facilitate transfer of stripped cotton to the trough, and certain of the arms comprising beater members to positively engage and move the transferred cotton along the floor means of the trough means.

MERRILL W. ROSCOE.

References Cited in the file of this patent

UNITED STATES PATENTS

| Number | Name | Date |
|---|---|---|
| 555,439 | Edgar | Feb. 25, 1896 |
| 1,169,915 | Beran | Feb. 1, 1916 |
| 2,001,079 | Court | May 14, 1935 |
| 2,406,058 | Boone | Aug. 20, 1946 |